United States Patent
Anzai et al.

(10) Patent No.: US 8,386,492 B2
(45) Date of Patent: Feb. 26, 2013

(54) INFORMATION PROCESSING SYSTEM AND DATA BACKUP METHOD IN INFORMATION PROCESSING SYSTEM

(75) Inventors: Tomoya Anzai, Ebina (JP); Takahiro Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 771 days.

(21) Appl. No.: 12/527,410

(22) PCT Filed: May 26, 2009

(86) PCT No.: PCT/JP2009/002320
§ 371 (c)(1),
(2), (4) Date: Aug. 14, 2009

(87) PCT Pub. No.: WO2010/137064
PCT Pub. Date: Dec. 2, 2010

(65) Prior Publication Data
US 2011/0289058 A1 Nov. 24, 2011

(51) Int. Cl.
*G06F 17/30* (2006.01)
(52) U.S. Cl. ........................................ 707/740
(58) Field of Classification Search .................. 707/640, 707/650, 999.204
See application file for complete search history.

(56) References Cited

U.S. PATENT DOCUMENTS

| | | | |
|---|---|---|---|
| 5,963,962 A | 10/1999 | Hitz et al. | |
| 7,237,076 B2 | 6/2007 | Nakano et al. | |
| 7,376,804 B2 * | 5/2008 | Ido et al. | 711/162 |
| 7,395,284 B2 * | 7/2008 | Sato et al. | 1/1 |
| 7,739,233 B1 * | 6/2010 | Ghemawat et al. | 707/610 |
| 7,827,214 B1 * | 11/2010 | Ghemawat et al. | 707/822 |
| 8,065,268 B1 * | 11/2011 | Ghemawat et al. | 707/610 |
| 8,190,576 B2 * | 5/2012 | Yamaguchi et al. | 707/653 |
| 2004/0186900 A1 * | 9/2004 | Nakano et al. | 709/213 |
| 2007/0150677 A1 * | 6/2007 | Homma et al. | 711/162 |
| 2009/0044046 A1 * | 2/2009 | Yamasaki | 714/6 |
| 2009/0077134 A1 * | 3/2009 | Ueoka et al. | 707/200 |

OTHER PUBLICATIONS

S. Ghemawat et al., "The Google File System," ACM SIGOPS Operation Systems Review Archive, vol. 37, Issue 5, Dec. 2003, SOSP '03, 15 pgs.
Siddha, Suresh B. et al., A Persistent Snapshop Device Driver for Linus, Proceedings of Annual Linux Showcase and Conference, Nov. 10, 2001, pp. 173-182, XP-002317993.

* cited by examiner

*Primary Examiner* — Mohammed R Uddin
(74) *Attorney, Agent, or Firm* — Foley & Lardner LLP

(57) ABSTRACT

An information processing system retains one or more files utilized by an external apparatus, each of which is made up of a plurality of chunks, in a manner that the chunks making up each of the files are distributed. The information processing system includes a plurality of chunk servers, each storing chunks, and one master server communicatively coupled thereto. The master server retains a file name of a file, chunk IDs indicating chunks making up the file, and chunk IDs indicating chunk servers storing the chunks. When a snapshot taking request for a file is received, the master server identifies chunks included in the file from the file name and the chunk IDs to instruct the chunk servers having these chunks to take a differential snapshot of each of the chunks with the use of a differential snapshot function included in a local file system of each of the chunk servers.

10 Claims, 16 Drawing Sheets

FILE INFORMATION

SNAPSHOT TAKING PROCESS

Fig. 16

FILE INFORMATION MANAGEMENT TABLE 1600

| FILE NAME | /usr/data/a | /usr/data/b | ... |
|---|---|---|---|
| CHUNK ID | 00 | 10 | |
| | 01 | 11 | |
| | 02 | 12 | |
| | ... | ... | |
| | | | |

Fig. 17

CHUNK MANAGEMENT TABLE 1700

| ID | CHUNK SERVER ID | REFERENCE COUNTER |
|---|---|---|
| ⋮ | ⋮ | ⋮ |
| 01 | chunk101/chunk203/chunk307 | 2 |
| 02 | chunk103/chunk205/chunk302 | 1 |
| ⋮ | | ⋮ |
| 12 | chunk103/chunk205/chunk302 | 1 |
| ⋮ | | |

Fig. 18A
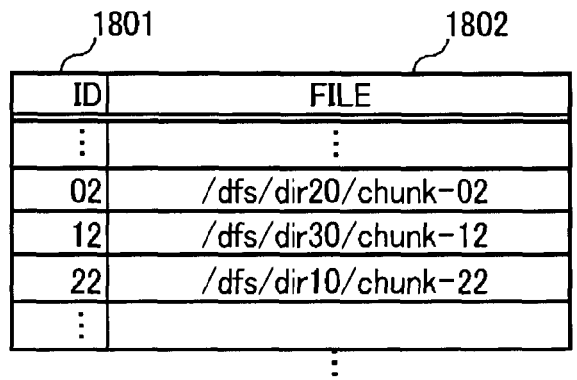
FIG. 18A
Fig. 18B
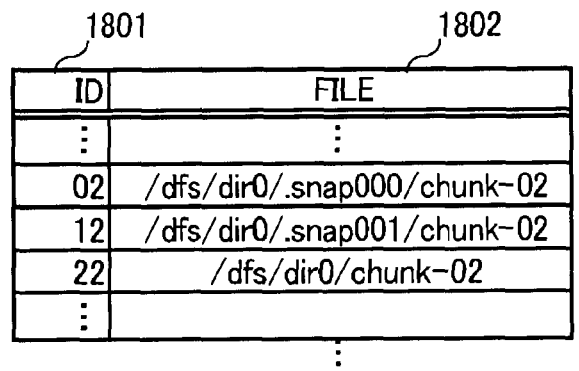

INFORMATION PROCESSING SYSTEM AND DATA BACKUP METHOD IN INFORMATION PROCESSING SYSTEM

TECHNICAL FIELD

The present invention relates to an information processing system and a data backup method in the information processing system, and, more particularly, to an information processing system and a data backup method in the information processing system capable of efficiently performing data backup in an information processing system that executes a large amount of data processes while saving a storage capacity to be used.

BACKGROUND ART

A large-scale distribution file system attracts attention and is utilized as a cloud computing base for executing very large scale scientific and engineering calculations, etc. The cloud computing is a term referring to a configuration that, for example, a plurality of server computers is coupled through a network to enable users to utilize the data processing capabilities of the server computers without a consciousness of the hardware configuration and has the same meaning as network computing herein, for example.

A representative example of such a cloud computing base is GFS (the Google File System, see NPL 1). Since very large data is handled in a file system employed in the GFS, one data file is divided into units called "chunks" having a relatively large size and stored in a plurality of servers (hereinafter "chunk servers") provided on a network. For example, one data file (hereinafter, simply "file") may be on the order of GBs or more and is made up as a set of a plurality of chunks each having a data size of 64 MB. Information of each file, information of the whole file system, etc., are managed by one master server communicatively coupled to a plurality of the chunk servers through a network. One pseudo file system is created by one master server managing a multiplicity of the chunk servers.

In a calculation process handling such large scale data, one calculation may take a few hours to a few days. Final data may be acquired by repeatedly utilizing the large-scale result data calculated as above in another calculation in some cases. Therefore, if a mistake in calculation, a lack of data, etc., occur in the middle of a calculation process, a huge amount of time is required for performing the calculation again. Since a portion of a huge size of data is often changed to repeat the same calculation in the applications such as simulations, etc., a multiplicity of huge similar data must be retained.

The GFS provides a snapshot function to be prepared for such situations and applications. The snapshot function is a function of retaining an image of a file, etc., at a certain time point to enable the image of the time point to be read later. The snapshot of the GFS is a function of retaining differences for each chunk with data updated to enable the backup and retention of a plurality of data without copying whole data making up a file.

On the other hand, a differential snapshot is a similar technology provided in a normal file system, etc., locally established in one server (hereinafter, "local file system"). This is a technology implementing the snapshot with a small capacity by retaining a difference between an image of a file, a directory, an entire local file system, etc., at a certain time point and a current image for each block of several KB to several tens of KB. The differential snapshot is disclosed in PTL 1 and PTL 2.

Citation List
Patent Literature
PTL 1: U.S. Pat. No. 5,963,962
PTL 2: U.S. Pat. No. 7,237,076
Non Patent Literature
NPL 1: Sanjay Ghemawat, Howard Gobioff, and Shun-Tak Leung, "The Google File System", ACM SIGOPS Operating Systems Review archive Volume 37, Issue 5 (December 2003), SOSP '03

SUMMARY OF INVENTION

Technical Problem

Although a difference is retained only for each chunk in a snapshot function provided in GFS, a chunk size is larger than a file size in a local file system since large-scale files are handled, and a large storage capacity is consumed since an entire chunk is copied for a small amount of difference.

On the other hand, if a chunk size is reduced to constrain storage capacity consumption in the snapshot function, the number of chunks making up a file is increased, resulting in a problem that management/retrieval costs of chunks and communication costs between a master server and chunk servers are increased.

Since chunk data is replicated and stored in a plurality of chunk servers to ensure the fault tolerance in the GFS, a plurality of copies of chunks generated by the snapshot function is also retained and it is problematic that a storage capacity is further consumed correspondingly to the number of replications.

The present invention was conceived to solve the above and other problems and it is therefore one object of the present invention to provide an information processing system and a data backup method in an information processing system capable of efficiently performing data backup in an information processing system that executes a large amount of data processes while saving a storage capacity to be used.
Solution to Problem In order to solve the above and other problems, an aspect of the present invention provides an information processing system that retains one or more data files utilized by an external apparatus, each of which is made up of a plurality of data blocks, in a manner that the data blocks making up each of the files are distributed, comprising a first information apparatus that retains a data file ID as an identification code for identifying each of the data files and a data block ID as an identification code for identifying each of the data blocks making up the data files in a correlated manner, and a plurality of second information apparatuses communicatively coupled to the first information apparatus, each of which retains a plurality of the data blocks and the data block ID in a correlated manner, the second information apparatus being allocated with apparatus ID as an identification code for identifying each of the second information apparatuses, the first information apparatus, in response to an inquiry with the data file ID from the external apparatus, transmitting the apparatus ID of the second information apparatus retaining the data block making up the data file identified by the data file ID and the data block ID of the data block to the external apparatus, the first information apparatus retaining the data block ID and the apparatus ID of the second information apparatus retaining the data block identified by the data block ID in a correlated manner, the first information apparatus including a file system management unit that replicates the data file ID owned by the data file and the data block ID of the data block making up the data file, the second information apparatus including a differential data copy processing unit that executes a differential data copy process of replicating and retaining only differential data for the data block if the data block retained by the second information apparatus is updated from the external apparatus, the first information apparatus, upon receipt of a backup process request for the data file identified by the data file ID, identifying the second information apparatus retaining the data block making up the data file from the data file ID of the data file of the backup process request and transmitting an instruction for executing a differential data copy process for the data block to the differential data copy processing unit of the second information apparatus, the instructed differential data copy processing unit executing a differential data copy of the data block and correlating a file generated by the differential data copy with the data block ID.

Another aspect of the present invention provides an information processing system that retains one or more data files utilized by an external apparatus, each of which is made up of a plurality of data blocks, in a manner that the data blocks making up each of the files are distributed, comprising a first information apparatus that retains a data file ID as an identification code for identifying each of the data files and a data block ID as an identification code for identifying each of the data blocks making up the data files in a correlated manner, and a plurality of second information apparatuses communicatively coupled to the first information apparatus, each of which retains a plurality of the data blocks and the data block ID in a correlated manner, the second information apparatus being allocated with apparatus ID as an identification code for identifying each of the second information apparatuses, the first information apparatus, in response to an inquiry with the data file ID from the external apparatus, transmitting the apparatus ID of the second information apparatus retaining the data block making up the data file identified by the data file ID and the data block ID of the data block to the external apparatus, the first information apparatus retaining the data block ID and the apparatus ID of the second information apparatus retaining the data block identified by the data block ID in a correlated manner, the first information apparatus including a file system management unit that replicates the data file ID owned by the data file and the data block ID of the data block making up the data file, the second information apparatus including a differential data copy processing unit that executes a differential data copy process of replicating and retaining only differential data for the data block if the data block retained by the second information apparatus is updated from the external apparatus, the first information apparatus upon receipt of a backup process request for the data file identified by the data file ID, copying correlation between the data file ID and the data block ID identifying the data block making up the data file, the first information apparatus, upon receipt of an update request for the data file of the backup process request from the external apparatus after the backup process request is executed, identifying a corresponding data block in the data file in accordance with information related to the data block to be updated associated with the update request, generating the new data block to allocate the new data block ID thereto, identifying the second information apparatus that retains the data block to be updated, and driving the differential data copy processing unit of the second information apparatus to execute a process of correlating the data block ID of the new data block with the data block before the differential data copy process.

Advantageous Effects of Invention

The present invention may provide an information processing system and a data backup method in an information processing system capable of efficiently performing data backup in an information processing system that executes a large amount of data processes while saving a storage capacity to be used.

BRIEF DESCRIPTION OF DRAWINGS

FIG. 16 is a diagram of an exemplary configuration of a file information management table 1600.

FIG. 17 is a diagram of an exemplary configuration of a chunk management table 1700.

FIG. 18A is a diagram of an exemplary configuration of a conventional chunk file management table 1800.

FIG. 18B is a diagram of an exemplary configuration of the chunk file management table 1800 used in the information processing system 1 according to the present invention.

DESCRIPTION OF EMBODIMENTS

Embodiments for implementing the present invention will now be described with reference to the drawings.

Schematic of Information Processing System

Figure 1:
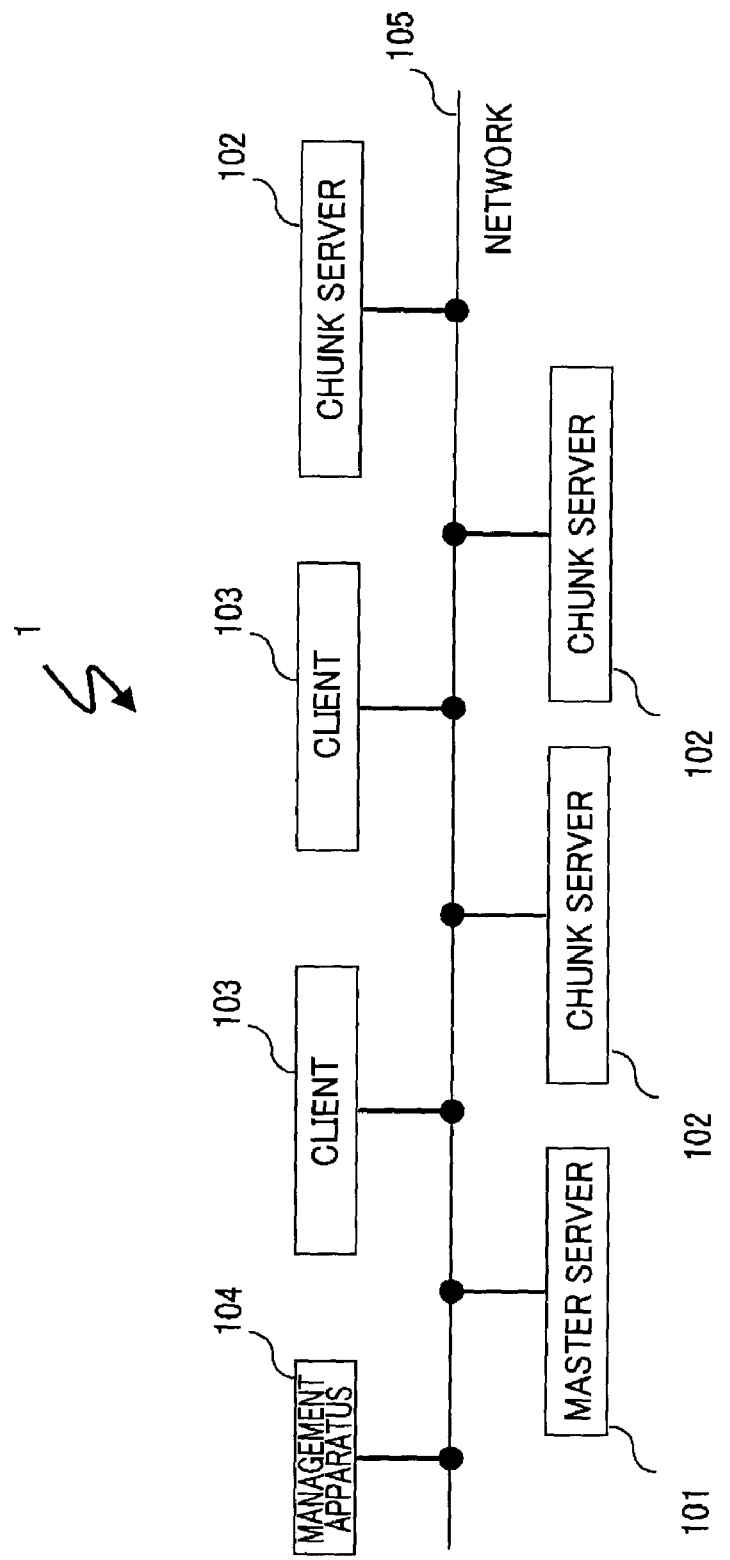
FIG. 1 is a diagram of an exemplary configuration of an information processing system 1 according to the present invention.

FIG. 1 is a diagram of an exemplary configuration of an information processing system 1 according to the present invention. The information processing system 1 of FIG. 1 is a distributed file system for processing large-scale data. The information processing system 1 includes, for example, one master server (first information apparatus) 101, a plurality of chunk servers (second information apparatuses) 102, one or more clients (external apparatuses) 103, and a management apparatus 104, and these elements are coupled to each other communicatively through a network 105.

The master server 101 is a computer that manages metadata related to files (data files) retained in the information processing system 1. The chunk server 102 stores data of chunks making up files retained in the information processing system 1. The "chunk" means a data block making up a portion of one file and no restriction is intended to be put on a data size, data contents, etc., by the term "chunk".

The client 103 is a computer with an application using the information processing system 1 in operation and, for example, if a file reading request is received from the application, the client 103 inquires the master server 101 for which chunk server 102 the chunks making up the file are stored and uses information related to the metadata of the file returned from the master server 101 to directly acquire the chunk data from the chunk server 102 retaining the chunks. Similarly, the client 103 executes a write process for a file based on metadata acquired from the master server 101.

The management apparatus 104 is utilized in such a case that the administrator of the information processing system 1 gives a snapshot taking instruction for a certain file to the information processing system 1.

Although the network 105 is the Internet or LAN (Local Area Network) that enables the computers to communicate through, for example, IP (Internet Protocol), other suitable forms of network may also be employed. Although the network 105 is a bus network in the example of FIG. 1, other topologies may be employed.

The configurations and functions of the master server 101, the chunk server 102, the client 103, and the management apparatus 104 will be described later.

System Configuration

Figure 2:
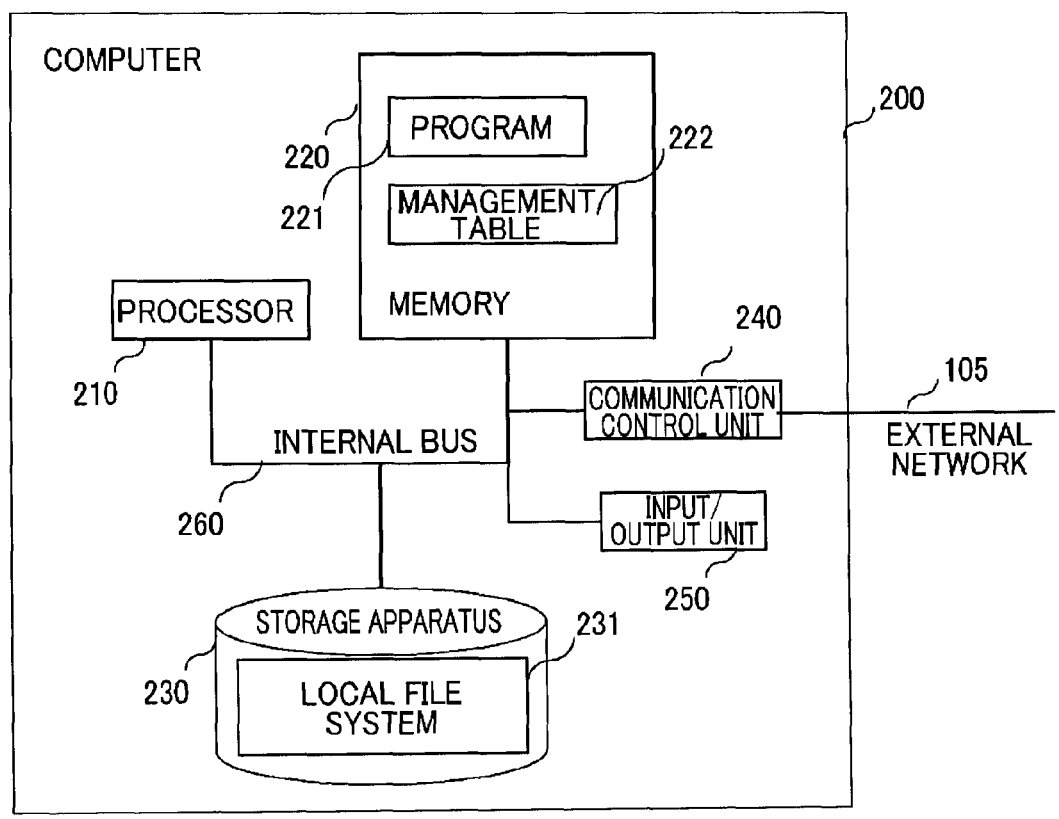
FIG. 2 is a diagram of an exemplary configuration of a computer 200 usable for a master server 101, a chunk server 102, a client 103, or a management apparatus 104.

FIG. 2 is a diagram of an exemplary configuration of a computer 200 usable for the master server 101, the chunk server 102, the client 103, or the management apparatus 104. The computer 200 includes a processor 210 (e.g., CPU (Central Processing Unit) or MPU (Micro Processing Unit)), a memory 220 (e.g., RAM (Random Access Memory) or ROM (Read Only Memory)), a storage apparatus 230, a communication control unit 240 (e.g., NIC (Network Interface Card)) that implements communication with another apparatus, and an input/output unit 250 (e.g., input devices such as a keyboard and a mouse, and output devices such as a liquid crystal monitor) and these units are communicatively coupled through an internal bus 260. Although an operating system (hereinafter, "OS") running on the computer 200 is not particularly limited to a certain system, a UNIX (registered trademark) OS such as Linux (registered trademark) is preferably used.

The memory 220 stores various programs 221 for implementing the function of the information processing system 1 of the embodiment and management tables 222 referenced by the programs 221. The programs 221 and the management tables 222 will be described later.

Figure 3:
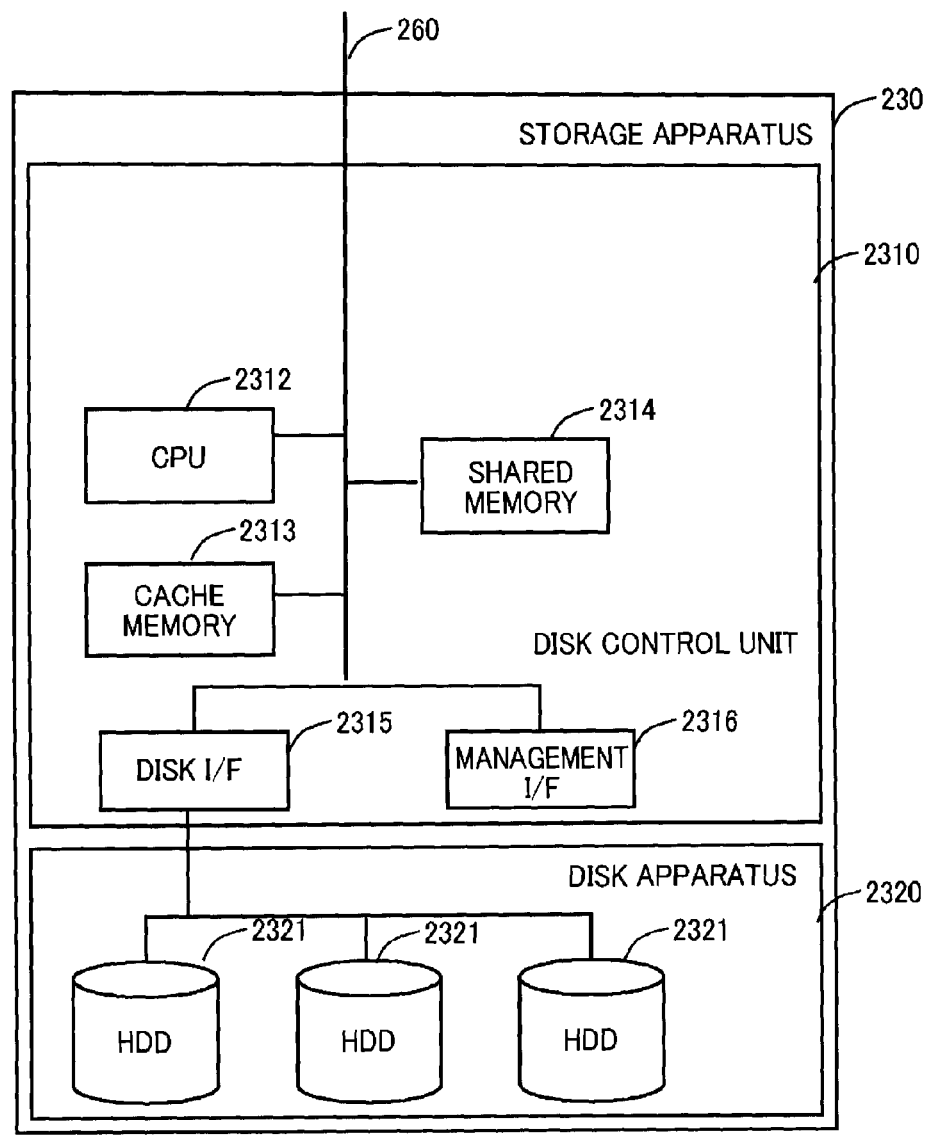
FIG. 3 is a diagram of an exemplary configuration of a storage apparatus 230.

The storage apparatus 230 is a subsystem that provides a data storage area for the computer 200. FIG. 3 depicts an exemplary configuration of the storage apparatus 230. As shown, the storage apparatus 230 may be a RAID (Redundant Array of Independent (or Inexpensive) Disks) system of a suitable type organized by a disk device 2320 including a plurality of HDDs (Hard Disk Drive) 2321, for example. Other storage medium such as SSD (Solid State Drive) may be used instead of the HDDs 2321.

The storage apparatus 230 includes the disk device 2320 and a disk control unit 2310 that executes a data I/O process with the processor 210 and a data I/O process with the HDDs 2321.

The disk control unit 2310 includes a CPU 2312, a cache memory (hereinafter, "CM") 2313, a shared memory (hereinafter, "SM") 2314, and a disk IF 2315 and these units are communicatively coupled through the internal bus 260.

The CM 2313 provides a storage area for temporarily storing data read written into the HDD 121 or data read from the HDD 2321. The SM 2314 stores, for example, programs for controlling data I/O of the storage apparatus 230 and various management tables used for controlling the programs. The SM 2314 also stores a control program for executing a data backup control process in the embodiment and management tables used by the control program.

The disk IF 2315 is a disk adapter (hereinafter, "DKA") as a communication interface provided for allowing communication between the disk control unit 2310 and the disk device 2320.

One or more local file systems 231 are created in the storage area provided by the storage apparatus 230 and the programs 221, the management tables 222, and file data are stored in the local file systems 231. The programs 221 are read onto the memory 220 by the processor 210 for execution at the start of the system as above.

The storage apparatus 230 may be configured as an external storage apparatus and employ a form of being coupled to and used with the computer 200 via various networks in addition to the built-in form in the computer 200 as shown in FIG. 2.

Although the computer 200 used as the client 103 may basically include the configuration described in FIG. 2, the computer 200 may employ other suitable configurations such as a configuration of a thin client with the storage apparatus 230 omitted, for example.

Software Configurations

The software configurations of the master server 101, the chunk server 102, the management apparatus 104, and the client 103 will then be described with reference to the drawings.

Master Server 101

Figure 4:
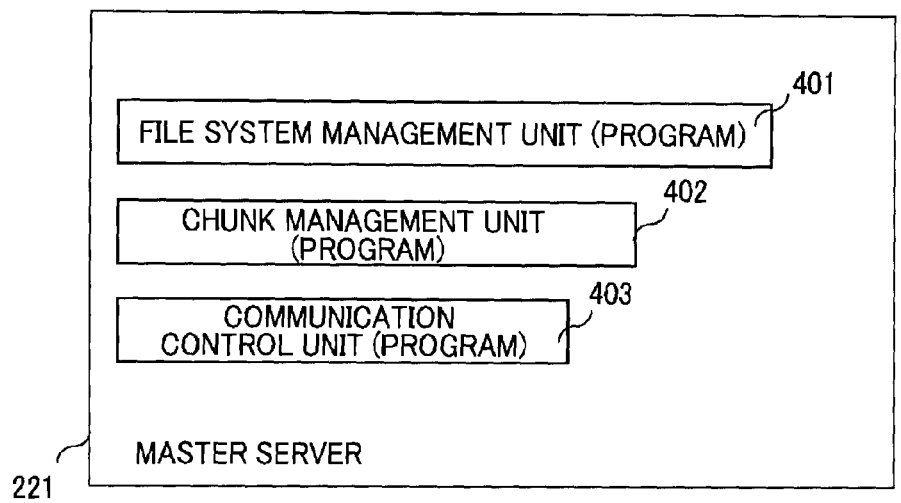
FIG. 4 is a diagram of an exemplary configuration of a program 221 read onto a memory 220 of the computer 200 making up the master server 101 for execution.

FIG. 4 depicts an exemplary configuration of the program 221 read onto the memory 220 of the computer 200 making up the master server 101 for execution. In this embodiment, the program 221 of the master server 101 is made up of a file system management program 401, a chunk management program 402, and a communication control program 403.

The file system management program 401 executes processes related to the whole file system established by the distributed file system implemented by the information processing system 1. The processes related to the whole file system specifically include creation, deletion, and writing of files and creation of a snapshot. The chunk management program 402 executes processes related to the chunks making up files retained in the information processing system 1, such as management of a chunk management table 1401 described later. The communication control program 403 executes processes related to communications with the client 103, the management apparatus 104, the chunk server 102, etc.

Hereinafter, in such a case that a process flow of a specific data process is described, for example, a function implemented by the file system management program 401 is referred to as a file system management unit 401 as emulation of hardware.

Chunk Server 102

Figure 5:
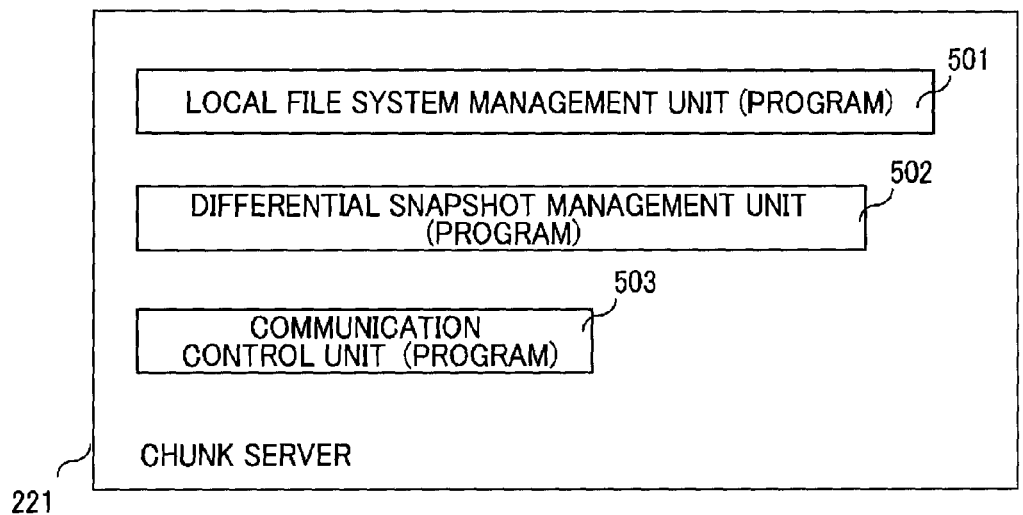
FIG. 5 is a diagram of an exemplary configuration of the program 221 read onto the memory 220 of the computer 200 making up the chunk server 102 for execution.

FIG. 5 depicts an exemplary configuration of the program 221 read onto the memory 220 of the computer 200 making up the chunk server 102 for execution. In this embodiment, the program 221 of the chunk server 102 is made up of a local file system management program 501, a differential snapshot management program 502, and a communication control program 503.

The local file system management program 501 executes processes related to the local file systems 231. The processes related to the local file systems 231 specifically include creation, writing, reading, and deletion of chunk files.

The differential snapshot management program 502 executes processes related to a differential snapshot. The processes related to a differential snapshot specifically include taking and deletion of a differential snapshot. If the chunk server 102 is running on Linux, the differential snapshot process is implemented by taking a snapshot of the whole file system with a logical volume manager (LVM), for example. If the chunk server 102 is made up of DataONTAP (registered trademark) OS of NetApp (registered trademark), Inc., the differential snapshot process is implemented by taking a snapshot for each file with SnapShot (registered trademark) function. It is to be noted that the OS of the chunk server 102 is not to be limited to the above OS from NetApp, Inc. but the chunk server 102 can be configured with a different OS which can provide a snapshot function on a file basis.

The communication control program 503 executes processes related to communications with the client 103, the master server 101, etc.

Management Apparatus 104

Figure 6:
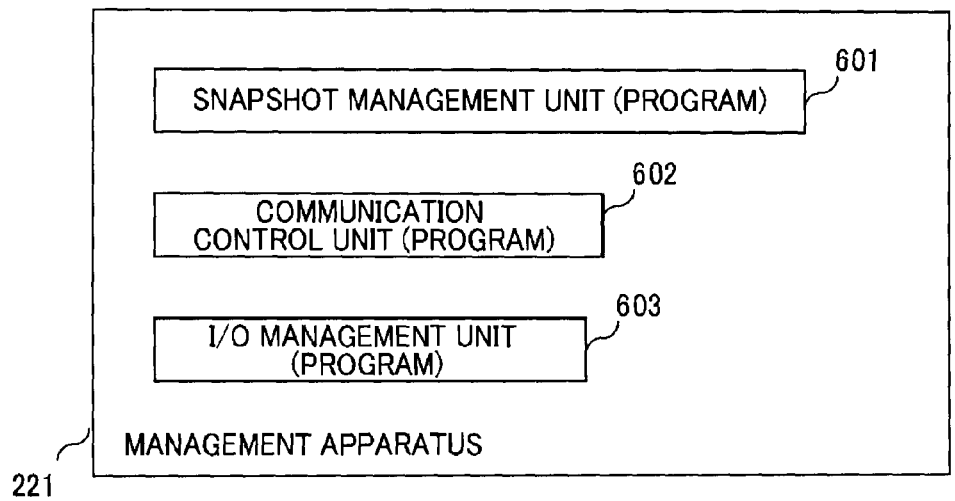
FIG. 6 is a diagram of an exemplary configuration of the program 221 read onto the memory 220 of the computer 200 making up the management apparatus 104 for execution.

FIG. 6 depicts an exemplary configuration of the program 221 read onto the memory 220 of the computer 200 making up the management apparatus 104 for execution. In this embodiment, the program 221 of the management apparatus 104 is made up of a snapshot management program 601, a communication control program 602, and an input/output (I/O) management program 603.

The snapshot management program 601 executes processes related to snapshots such as snapshot taking and deletion instructions, etc. In the processes related to snapshots, specifically, instructions for taking or deleting snapshots of the file systems and files are given to the master server 101 in response to instructions input from the administrator through the input/output unit 250 or in accordance with predefined schedules. The communication control program 602 executes processes related to communications with the master server 101, etc. The I/O management program 603 transfers the snapshot taking instruction input from the administrator through the input/output unit 250 to the snapshot management program 601 and outputs the process results through output devices, etc.

Client 103

Figure 7:
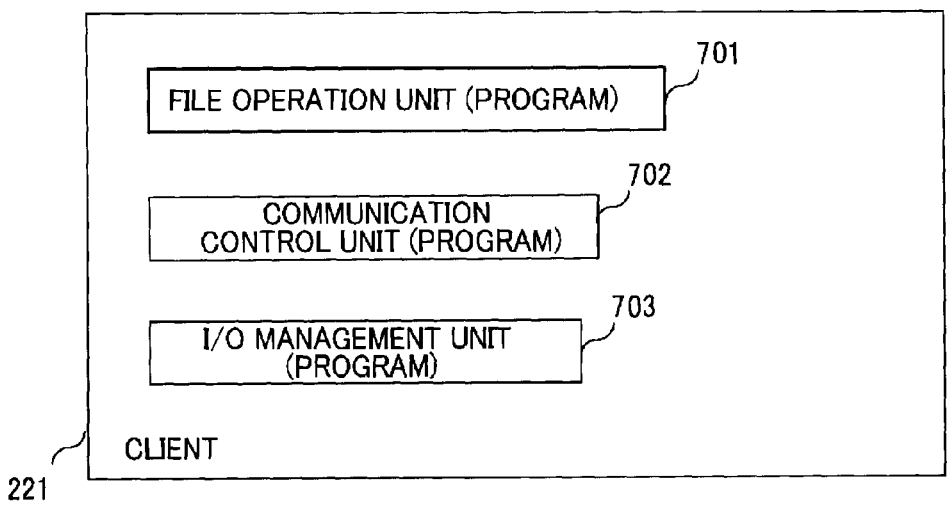
FIG. 7 is a diagram of an exemplary configuration of the program 221 read onto the memory 220 of the computer 200 making up the client 103 for execution.

FIG. 7 depicts an exemplary configuration of the program 221 read onto the memory 220 of the computer 200 making up the client 103 for execution. In this embodiment, the program 221 of the client 103 is made up of a file operation program 701, a communication control program 702, and an input/output (I/O) management program 703.

The file operation program 701 executes processes of giving instructions for reading, writing, and updating files retained in the distributed file system that is the information processing system 1. The communication control program 702 executes processes related to communications with the master server 101, the chunk server 102, etc. The I/O management program 703 executes processes of transmitting instructions related to file operations input from a user through the input/output unit 250 to the file system management unit (program) 401 of the master server 101 and transmitting chunk reading instructions, etc., for a corresponding file to the local file system management program 501 of the chunk server 102 based on the information from the file system management unit (program) 401 of the master server 101.

Schematic of Data Process in Information Processing System

The schematic of the data process in the information processing system 1 according to one embodiment of the present invention will then be described with reference to the diagrammatic views.

File Information

Figure 8:
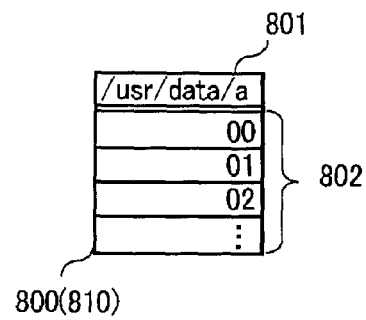
FIG. 8 is diagram of an exemplary configuration of file information 800 in the information processing system 1.

FIG. 8 depicts an exemplary configuration of file information 800 in the information processing system 1. As described above, a file configuration of a file (e.g., a file 901 of FIG. 9 described later) retained in the information processing system 1 is made up of metadata stored at the beginning of the file and a plurality of chunks (data main body, e.g., chunks 902 of FIG. 9) attached thereto. The metadata is recorded as items typically considered as metadata of a file, such as a file name and created year/month/date, for example. The chunk 902 is the data main body divided by 64 MB, for example.

In this embodiment, the file information 800 recording information of the file 901 sequentially stores a file name (data file ID) 801 added to the file 901 and chunk IDs (data block ID) 802 added to the chunks 902 for identifying each of the chunks 902 making up the file 901. The example of FIG. 8 represents that the file 901 having the file name 801 of "/usr/data/a" includes the chunks 902 having the chunk IDs 802 of "00", "01", "02", etc. The file information 800 is retained in a file information management table 1600 of the master server 101 in the embodiment.

Snapshot Taking Process

Figure 9:
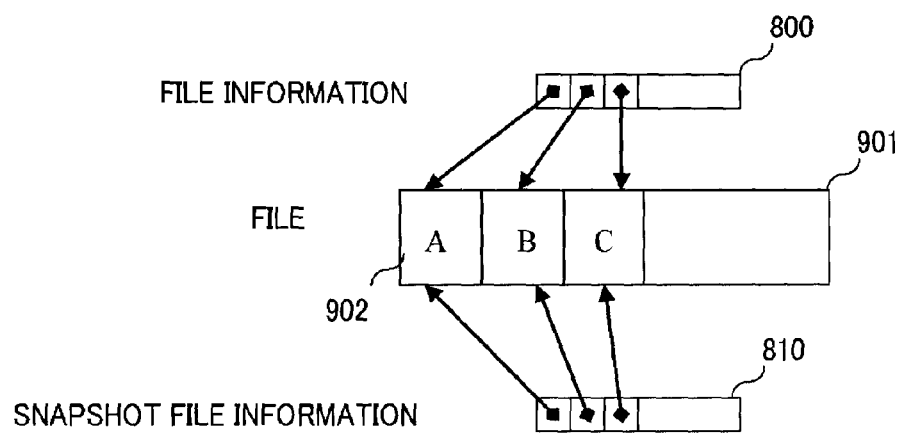
FIG. 9 is a diagrammatic view of a snapshot taking process in the information processing system 1.

The snapshot taking process will then be described. FIG. 9 diagrammatically depicts the snapshot taking process in the information processing system 1. The file information 800 is retained in the master server 101 as above and configured to sequentially point the chunks A, B, C, etc., (902) making up the file 901. Specifically, the file information 800 sequentially stores the file name 801 and the chunk IDs 802 added to the respective chunks A, B, C, etc.

Snapshot file information 810 has the same configuration as the file information 800 and is created by duplicating the file information 800 in the master server 101 with the file system management unit 401 of the master server 101. FIG. 9 depicts a state immediately after the snapshot is taken. At the time of taking of the snapshot, the chunks A, B, C, etc., making up the file 901 are not copied. The snapshot file information 810 is correlated with the same chunks A, B, C, etc., as the file information 800.

File Update Process in Snapshot

The file update process in the snapshot and a Copy-on-Write (hereinafter, "CoW") process will then be described.

Figure 10:
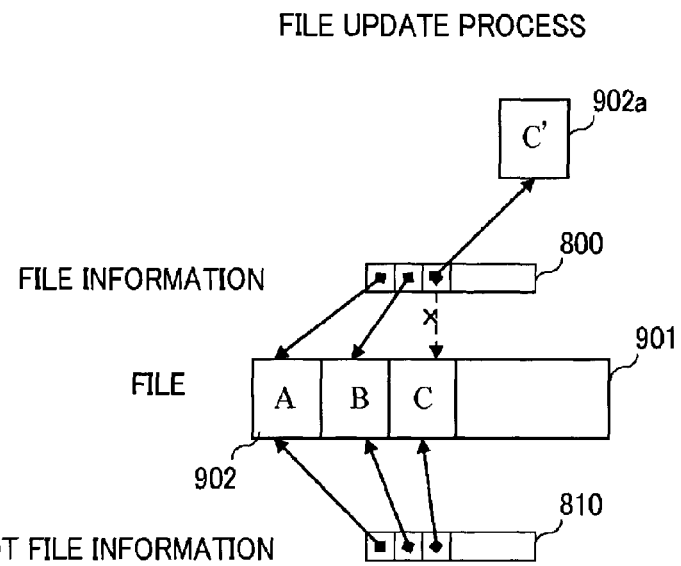
FIG. 10 is a diagrammatic view of a CoW process of a snapshot.

FIG. 10 diagrammatically depicts the file update process for the snapshot. In the information processing system 1, the file update process for the snapshot is executed by the CoW process. After the taking of the snapshot shown in FIG. 9, if an update (On Write) is requested from the client 103 for the chunk C included in the file 901, a new chunk C' (902a) is allocated and the pointer indicating the chunk C is rewritten to the chunk C' in the file information 800 to perform the update for the chunk C'. On the other hand, since the chunk C is still correlated with the file 901 in the snapshot file information 810, the file information 800 at the time of the snapshot taking may be referenced.

Conventional File Update Process

Figure 11:
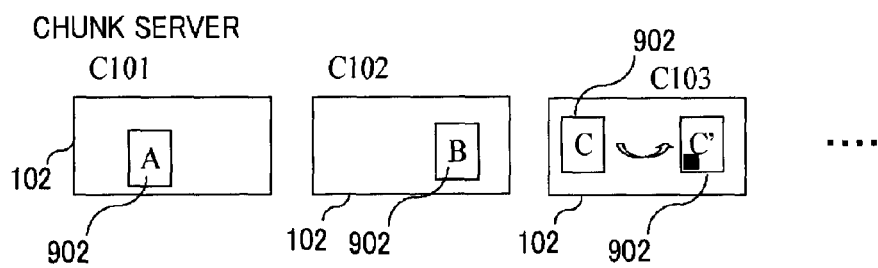
FIG. 11 is a diagram of a state of storage of chunks A, B, C, etc., (902) in the chunk servers 102 of the information processing system 1.

FIG. 11 depicts a state of storage of the chunks A, B, C, etc., (902) in the chunk servers 102 of the information processing system 1. The respective chunks A, B, C, etc., making up the file 901 are distributed and stored in the different chunk servers 102. In this case, the chunks A, B, C, etc., are stored in the respective chunk servers 102 having server IDs of C101, C102, C103, which are identifiers added to the chunk servers 102 to identify each of the chunk servers 102.

After the snapshot taking, if an update of the chunk C is requested, a copy of the chunk C, i.e., the chunk C' is created on the chunk server C103 storing the chunk C and the update data is written for the chunk C'.

Replication Process

Figure 12:
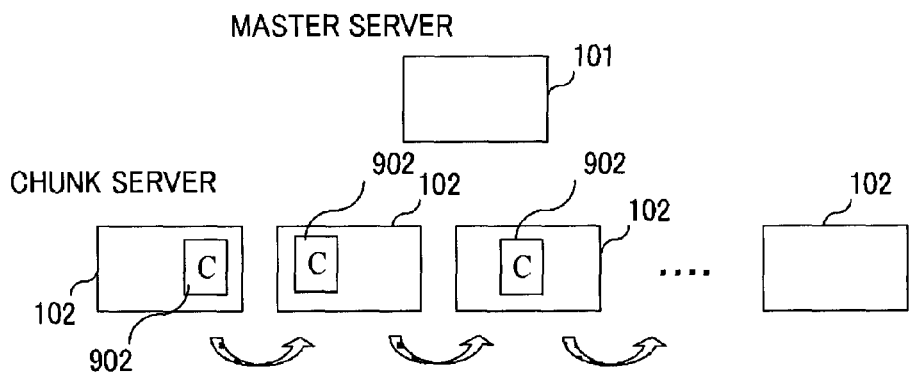
FIG. 12 is a diagrammatic view of replications of the chunk C in the chunk servers 102.

A replication process in the information processing system 1 will then be described. FIG. 12 diagrammatically depicts replications of the chunk C in the chunk servers 102. To maintain data, the chunks 902 included in the file 901 are distributed and stored in a plurality of the chunk servers 102. In the embodiment, the same chunk 902 (e.g., chunk C) is replicated and stored in the three chunk servers 102 and the locations of the replications are managed by the master server 101.

Differential Snapshot (Differential Data Copy) Taking Process

Figure 13:
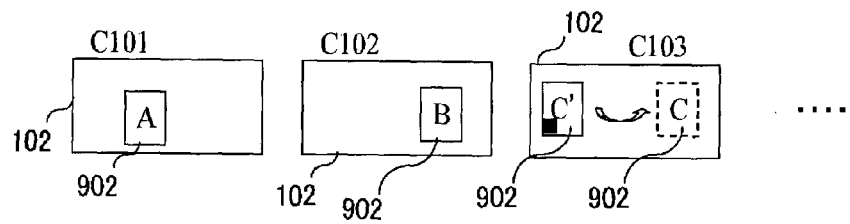
FIG. 13 is a diagrammatic view of a differential snapshot process of the chunk 902 in the chunk servers 102 of the information processing system 1.

A differential snapshot taking process in the information processing system will then be described. FIG. 13 diagrammatically depicts a differential snapshot process of the chunk 902 in the chunk servers 102 of the information processing system 1.

When a snapshot of the file 901 is taken in the master server 101, a differential snapshot is taken in the chunk servers 102 storing the chunks A, B, C, etc., (902) making up the file 901. FIG. 13 depicts a state that the chunk server C103 storing the chunk C provides a differential snapshot for clarity while each of the other chunk servers has a differential snap shot taking function. In this case, the original chunk C is configured as the differential snapshot in the chunk server 102 and the original file of the chunk C is thereafter handled as the new chunk C'. Therefore, the writing to the chunk C' is performed for the current chunk C', i.e., the file that was originally the chunk C. As described above, such a differential snapshot function is implemented by a function provided by the OS of the chunk servers 102 (e.g., LVM of Linux).

Description of Management Tables

Figure 14:
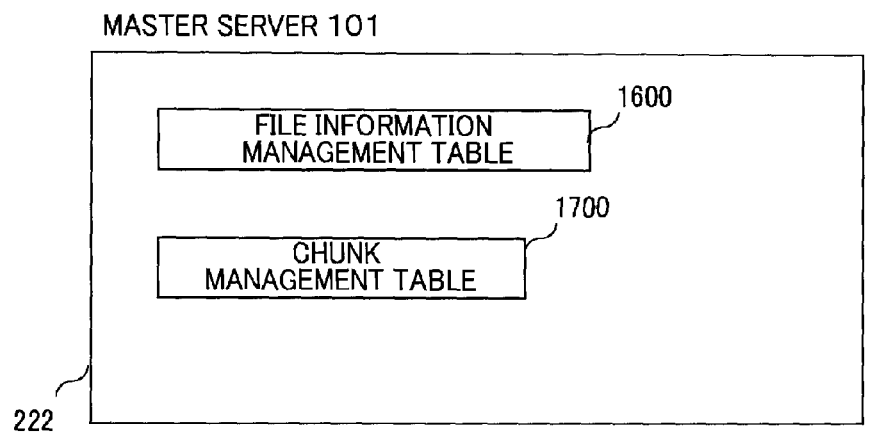
FIG. 14 is a diagram of an exemplary configuration of a management table 222 retained in the master server 101.

The management tables used in the embodiment will then be described. FIG. 14 depicts an exemplary configuration of the management table 222 retained in the master server 101. The management table 222 of the master server 101 includes the file information management table 1600 and the chunk management table 1700. The file information management table 1600 and the chunk management table 1700 will be described later.

Figure 15:
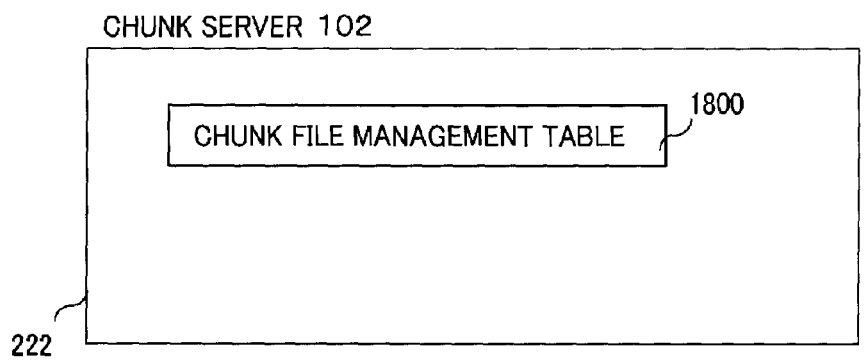
FIG. 15 is a diagram of an exemplary configuration of the management table 222 retained in the chunk server 102.

FIG. 15 depicts an exemplary configuration of the management table 222 retained in the chunk server 102. The management table 222 of the chunk server 102 includes a chunk file management table 1800. The chunk file management table 1800 will be described later.

File Information Management Table 1600

FIG. 16 depicts an exemplary configuration of the file information management table 1600. The file information management table 1600 includes file name fields 1601 and chunk ID fields 1602. As stated for the file information 800 of FIG. 8, the file information management table 1600 records all the pieces of the file information 800 and the snapshot file information 810 related to the file 901 retained in the master server 101. The file system management program 401 of the master server 101 may refer to the file information management table 1600 to acquire the chunk IDs 1602 of the respective chunks 902 making up the file 901 through the file name 1601 of the certain file 901.

Chunk Management Table 1700

FIG. 17 depicts an exemplary configuration of a chunk management table 1700. The chunk management table 1700 includes chunk ID fields 1701, chunk server ID (apparatus ID) fields 1702, and reference counter fields 1703.

The chunk ID fields 1701 record the chunk IDs 1701 that are identifiers added to the respective chunks 902 making up the file 901. The chunk server ID fields 1702 record chunk server IDs 1702 that are IDs added to the respective chunk server 102 storing the chunks 902 identified by the chunk IDs 1701 stored in the chunk ID fields 1701. The example of FIG. 17 represents that, for example, the chunk 902 identified by the chunk ID "01" is stored in the three chunk servers 102 identified by "chunk101", "chunk203", and "chunk307".

The reference counter fields 1703 indicate the total numbers of the file information 800 and the snapshot file information 810 pointing the chunks 902. For example, for the chunk 902 without a snapshot taken and pointed only from the file information 800, "1" is recorded as a value of the reference counter. If one snapshot is taken for the file 901, the chunks 902 making up the file 901 are pointed from the file information 800 and the snapshot file information 810. In this case, the reference counter field 1703 corresponding to the chunk ID 1701 of the chunk 902 records "2". Similarly, each time a snapshot is taken for the second time or later for the certain file 901, the values of the reference counter fields 1703 correlated with the chunks 902 making up the file 901 are incremented by one.

Chunk File Management Table 1800

FIG. 18A depicts an exemplary configuration of a conventional chunk file management table 1800. The chunk file management table 1800 is retained for each of the chunk servers 102 and indicates a list of the chunks stored in the chunk server 102.

The conventional chunk file management table 1800 includes chunk ID fields 1801 and chunk file name fields 1802. The chunk ID fields 1801 are the same as the chunk management table 1700 of FIG. 17. The chunk file name fields 1802 record chunk file names of the chunks 902 on the local file system 231 established in the chunk server 102.

The example of FIG. 18A represents that the file name 1802 of "/dfs/dir20/chunk-02" is added to the chunk 902 having the chunk ID 1801 of "02" on the local file system 231 of the chunk server 102. Similarly, in FIG. 18A of the conventional example, a copy of the chunk ID "02" is created each time the snapshot file is updated; the chunk IDs "12" and "22" are added to respective copies; and the respective file names 1802 are set as "/dfs/dir30/chunk-12" and "/dfs/dir10/chunk-22".

FIG. 18B depicts an exemplary configuration of the chunk file management table 1800 used in the information processing system 1 of the embodiment. The chunk file management table 1800 of the information processing system 1 includes the chunk ID fields 1801 and the chunk file name fields 1802 as is the conventional case.

A difference from the conventional chunk file management table 1800 of FIG. 18A is that, in the chunk file name fields 1802 for the chunks 902, the file names on the local file system 231 are used which are added to the chunks 902 having snapshots taken in the differential snapshot taking process executed by the chunk server 102. For example, in FIG. 18B, for the chunk 902 having the chunk ID 1801 of "02", after the snapshot file is taken and updated twice, the chunk ID 1801 turns to "22", and the chunk 902 having the chunk ID "22" corresponds to an operational file.

On the other hand, differential data for taking the snapshot file of the generation immediately before the chunk 902 of the chunk ID "22" is recorded for the chunk ID 1802 of "12", and the file name on the local file system 231 of the chunk server 102 is set as "/dfs/dir0/.snap001/chunk-02". Such setting of the file name of the differential data is determined depending on the specifications of the software providing the snapshot function running on the local file system 231 of the chunk server 102.

Process Flows Executed in Information Processing System 1

The process flows executed in the embodiment will hereinafter be described with reference to the drawings. For brevity of illustration, "snapshot" is abbreviated as "SS".

EXAMPLE 1

A first example of the present invention will be described mainly with reference to FIGS. 19 to 22.

Snapshot Taking Process

Figure 19:
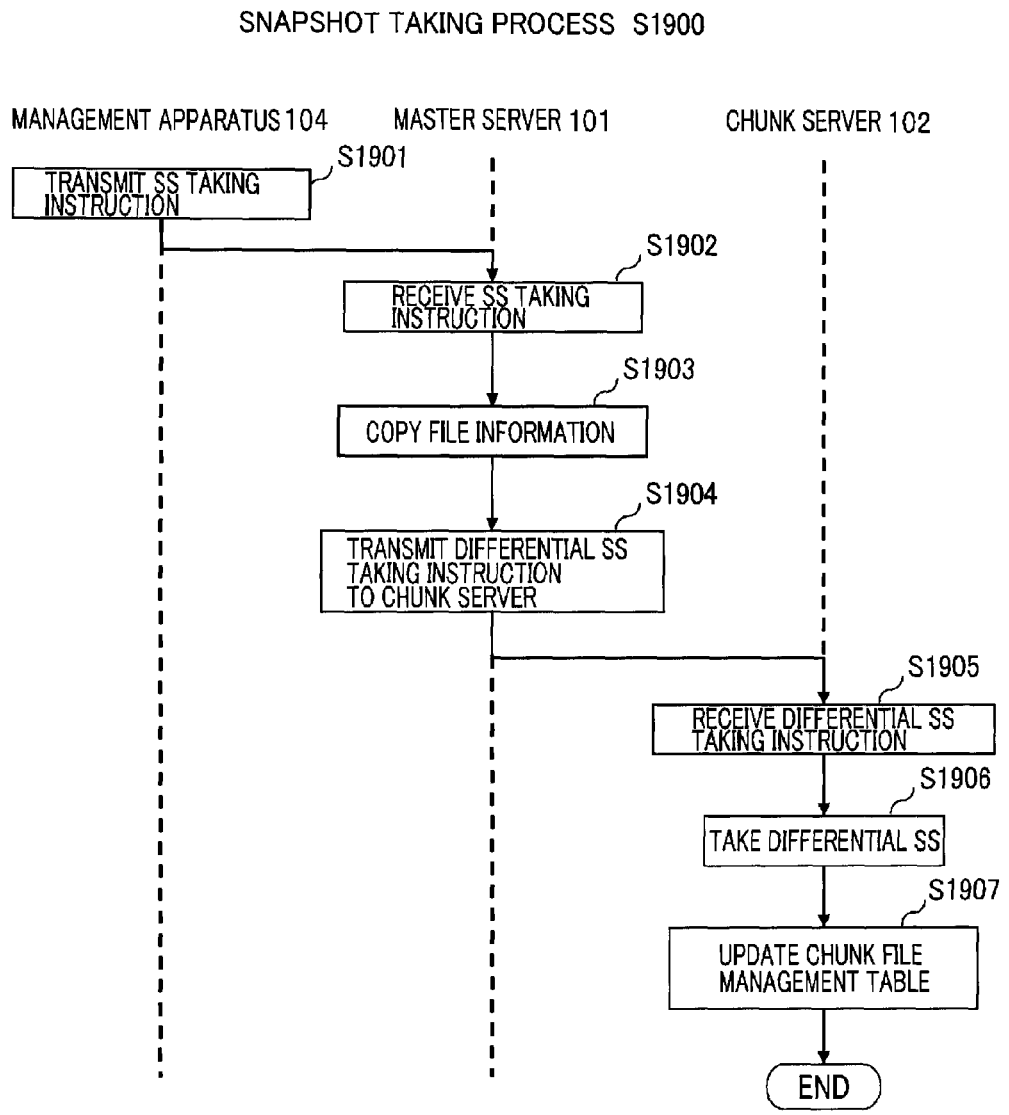
FIG. 19 is a flowchart of an example of a snapshot taking process in the information processing system 1 of the first example.

A snapshot taking process in the information processing system 1 of the example will be described with reference to FIG. 19.

When the administrator transmits an instruction for taking a snapshot of the certain file 901 to the master server 101 (s1901), the file system management unit 401 of the master server 101 receives this instruction (s1902). Specifically, the I/O management unit 603 of the management apparatus 104 receives the snapshot taking instruction from the administrator through the input/output unit 250 and the I/O management unit 603 transfers the instruction to the snapshot management unit 601.

The snapshot management unit 601 transfers the instruction to the file system management unit 401 of the master server 101 sequentially through the communication control unit (program) 602 of the management apparatus 104, the communication control unit 240 of the management apparatus 104, the network 105, the communication control unit 240 of the master server 101, and the communication control unit (program) 403 of the master server 101.

Since all the communication processes such as instructions among the functional blocks implemented by the programs provided in the computers 200 are executed as above, the description thereof will not be described.

The file system management unit 401 of the master server 101 copies the file information 800 of the file 901 and stores a file name of a snapshot file in the file name field 1901 (s1903). The file name of the snapshot file may be specified by the administrator along with the snapshot taking instruction at step s1901 or may automatically be determined by the master server 101 based on a predetermined rule. This process is a process of recording a column corresponding to the new snapshot file information 810 in the file information management table 1600.

On this occasion, the chunk management unit 402 of the master server 101 increments the reference counter 1703 of the chunk ID 1701 on the chunk management table 1700 by one. For example, in the example of FIG. 17, the reference counter 1703 corresponding to the chunk ID 1701 of "01" is "2". This indicates that the chunk 902 identified by the chunk ID 1701 is pointed by two pieces of file information, i.e., the original file information 800 and the snapshot file information 810.

The file system management unit 401 of the master server 101 then transmits an instruction for differential snapshot taking to the chunk server 102 (s1904). Specifically, the file system management unit 401 of the master server 101 identifies from the chunk management table 1700 the chunk servers 102 storing the respective chunks 902 indicated by the chunk ID 802 stored in the file information 800 of the file 901 to specify the chunk ID 802 and instruct all the chunk servers 102 to take the differential snapshot.

When the local file system management unit 501 of the chunk server 102 receives this instruction (s1905), the local file system management unit 501 makes an instruction for taking the differential snapshot to the differential snapshot management unit 502 to take the differential snapshot of the whole local file system 231 or the chunk files indicated by the chunk ID 802 (s1906). The form of the differential snapshot to be taken is dependent on the specifications of software for implementing the differential snapshot function operated in the chunk server 102 and the function setting and is determined in accordance with the management policy of the administrator managing the information processing system 1.

When the chunk server 102 takes the differential snapshot, the local file system management unit 501 of the chunk server 102 updates the chunk file management table 1800 (s1907). Specifically, the local file system management unit 501 stores a file name of the differential snapshot of the chunk 902 in a field of the chunk file name 1802 corresponding to the chunk ID 1801 of the instruction on the chunk file management table 1800 of the chunk server 102. In the example of FIG. 18B, "/dfs/dir0/.snap001/chunk-02" is stored as the file name 1802 of the differential snapshot of the chunk 902 having the chunk ID 1801 of "12".

The snapshot taking process is completed as above. With such a configuration, no wasteful storage capacity is consumed since the chunk 902 making up the file 901 is not actually copied when taking the snapshot of the file 901.

File Update Process

Figure 20:
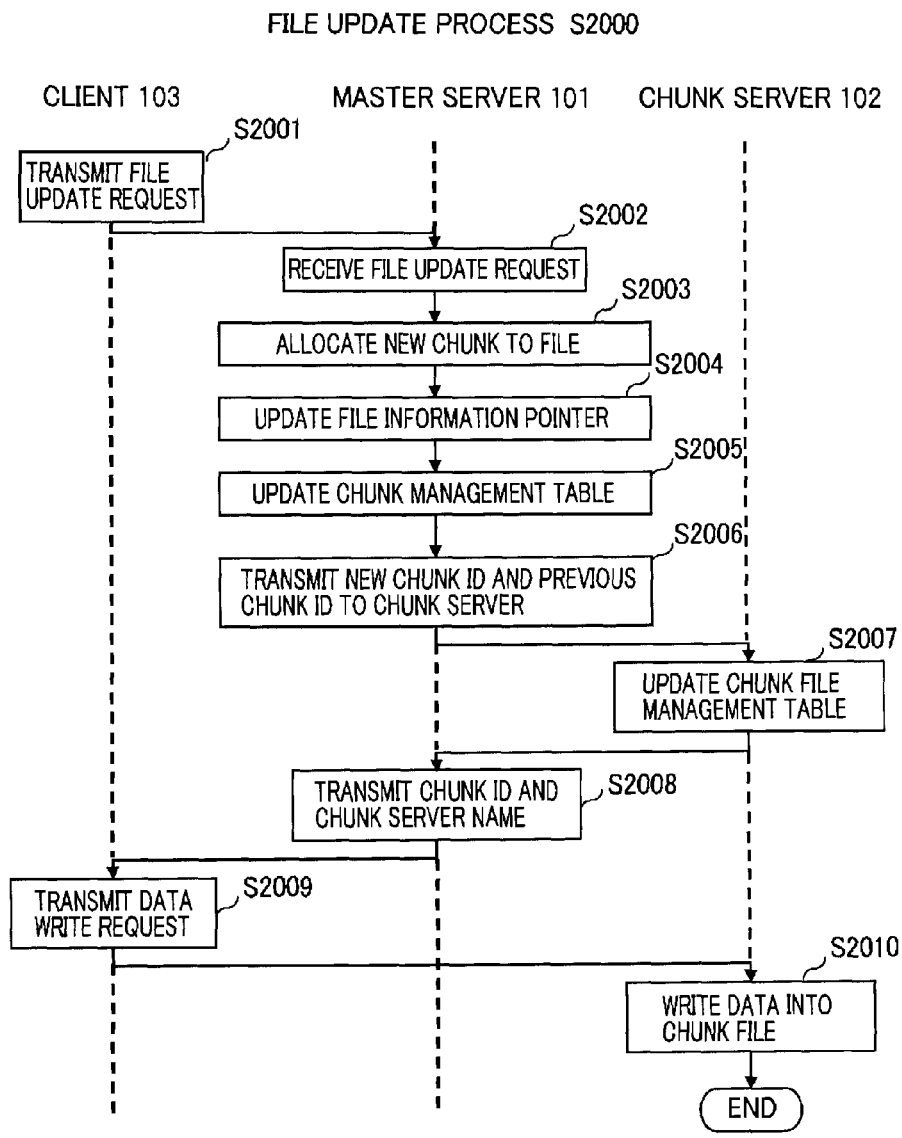
FIG. 20 is a flowchart of an example of a file update process in the information processing system 1 of the first example.

A file update process in the information processing system 1 of the example will then be described with reference to FIG. 20.

First, the master server 101 receives an update request for the file 901 from the client 103. Specifically, the client 103 transmits to the master server 101 the file name 801 of the file 901 to be updated, a location of the file to be updated (location from the beginning of the file), and a data size to be updated (s2001), which are received by the file system management unit 401 of the master server 101 (s2002).

The file system management unit 401 of the master server 101 identifies the chunk 902 to be updated based on the information associated with the received instruction and allocates the new chunk ID 802 to the chunk 902 (s2003). The chunk 902 to be updated may be identified based on the information received from the client 103 and the chunk size (e.g., 64 MB) predetermined in the information management system 1. On this occasion, only the new chunk ID 802 is allocated and the data of the chunk 902 itself is not copied.

The file system management unit 401 of the master server 101 updates the file information 800 of the file 901 on the file information management table 1600 (s2004). Specifically, the newly allocated chunk ID 802 is stored in the chunk ID field 802 of the file information 800. In the example of FIG. 10, the pointer from the original file information 800 to the chunk C to be updated is changed to the pointer to the added chunk C' after the update. In this case, if the chunk ID 802 allocated to the chunk C is "02" and the chunk ID 802 allocated to the chunk C' is "12", the chunk ID field 802 with "02" added is rewritten as "12" in the file information 800.

The chunk management unit 402 of the master server 101 then updates the chunk management table 1700 (s2005). Specifically, the chunk management unit 402 of the master server 101 adds a line for the chunk ID 1701 corresponding to the new chunk 902a on the chunk management table 1700, copies the contents of the chunk server ID 1702 corresponding to the chunk ID 1701 to be updated in the chunk server ID 1702 field on the line, and increase the reference counter 1703 by one (when the line of the chunk ID 1701 corresponding to the new chunk 902a is added, the reference counter 1703 is "0"). The value of the reference counter 1703 of the chunk ID 1701 to be updated is decreased by one due to the change in the pointer to the updated chunk 902 at the same time.

The file system management unit 401 of the master server 101 transmits the chunk ID 802 of the new chunk 902a and the chunk 902 to be updated to the local file system management units 501 of all the chunk servers 102 retaining the chunk 902 to be updated and gives an instruction for updating the chunk file management tables 1800 of the chunk servers 102 (s2006).

The chunk servers 102 receiving the update instruction update the chunk file management tables 1800 (s2007). Specifically, the local file system management unit 501 of the chunk server 102 adds a line for the chunk ID 802 of the new chunk 902a on the chunk file management tables 1800 and stores the current file name 1802 correlated with the chunk ID 1801 of the chunk 902 to be updated (instead of the differential snapshot image at the past time point) in the file name 1802 field.

For the current file name 1802, for example, if the chunk ID 1801 of the new chunk 902a is "22" and the chunk ID 1801 of the chunk 902 to be updated is "12" in the example of FIG. 18B, the chunk name 1802 "chunk-02" of the line with the chunk ID 1801 of "22" is reread and stored as "/dfs/dir0/chunk-02", which is the current file name of the "chunk-02". The change from the file name "chunk-02" to the full-length file name "/dfs/dir0/chunk-02" may be supported by using the name "chunk-02" in common for the both file names. Alternatively, different file names may be used if the correlations are separately managed by the differential snapshot management unit 502.

The example of FIG. 18B represents that the chunk ID "12" is newly allocated to the chunk file 902 originally having the chunk ID 1801 of "02" since the file is updated after the snapshot is taken, that the chunk ID "22" is then allocated since the file is updated after the snapshot is taken, and that the current file name of the chunk ID "22" is set as the original file name "/dfs/dir0/chunk-02" of the chunk file.

The master server 101 reads the chunk ID 802 of the new chunk 902a and the chunk server name 1702 of the chunk server storing the chunk 902 from the chunk management table 1700 and transmits the chunk ID 802 and the chunk server name 1702 to the client making the update request (s2008).

The client 103 receives the chunk ID 802 of the new chunk 902a as the chunk 902 to be updated and the storing chunk server name 1702 and transmits a write request to the chunk server 102 having the chunk server name 1702 (s2009) and the chunk server 102 performs the writing to the chunk file indicated by the chunk ID 802 (s2010). Specifically, the client 103 transmits the update data and the update location along with the chunk ID to be updated to one of the chunk servers 102.

The local file system management unit 501 of the chunk server 102 which received the data refers to the chunk file management table 1800 to write the update data into the file of the file name 1802 corresponding to the chunk ID 1801 to be updated. On this occasion, the differential snapshot management program 502 executes processes related to the differential snapshot such as saving the data of the updated portion before the update. The update data, the update location, and the information of the chunk ID to be updated received from the client 103 are sequentially transmitted to other chunk server storing the same chunk file and the same writing process is executed in the respective chunk servers 102.

The file update process is completed as above. With such a configuration, the storage capacity of the storage apparatus 230 of the chunk server 102 may efficiently be used since the minimum storage area for the new chunk 901 is allocated for the first time when the update of the file 901 is generated.

Snapshot File Reading Process

Figure 21:
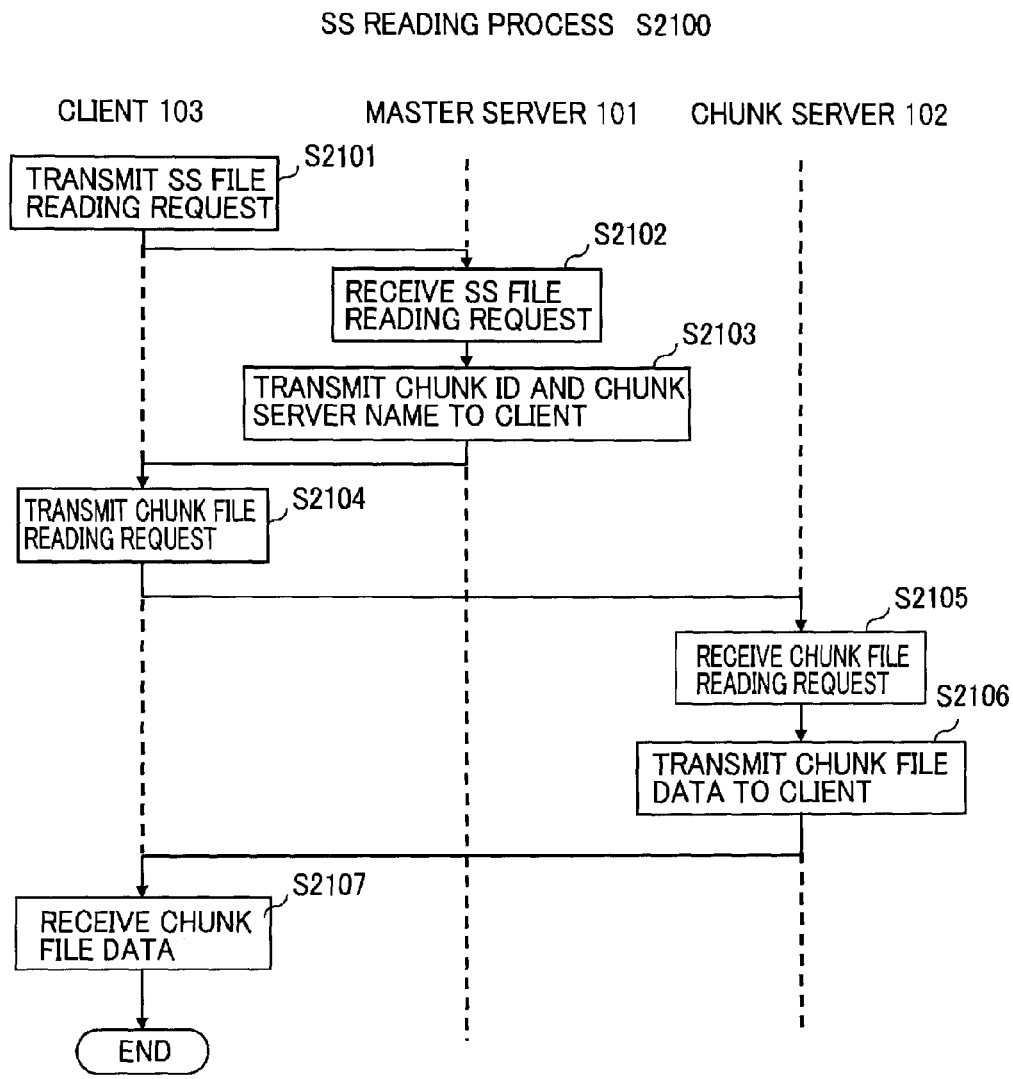
FIG. 21 is a flowchart of an example of a snapshot file reading process in the information processing system 1 of the first example.

A snapshot file reading process 52100 in the information processing system 1 of the example will be described with reference to FIG. 21.

First, the client 103 transmits a reading request for the snapshot file 901 to the master server 101 with the specification of the file name 801 (s2101).

The master server 101 receives the request and transmits the chunk IDs 1701 and a list of the chunk servers 102 storing the respective chunks 902 to the client 103 (s2102, s2103). Specifically, the file system management unit 401 of the master server 101 refers to the snapshot file information 810 of the requested file 901 on the file information management table 1600 and acquires the chunk ID 802 of the chunks 902 making up the file 901. The file system management unit 401 used the acquired chunk ID 802 to inquire the chunk management unit 402 for the chunk servers 102 managing the chunks 902 indicated by the chunk ID 802. The chunk management unit 402 refers to the chunk management table 1700 to acquire and transmit the chunk server IDs 1702 corresponding to the chunk IDs 1702 to the file system management unit 401. The file system management unit 401 transmits the chunk IDs 1702 and the chunk server IDs 1702 managing the respective chunks 902 to the client 103.

The client then transmits an acquisition request for the respective chunk files 902 to the respective chunk servers 102 based on the information received from the master server 101 (s2104). On this occasion, since a plurality of the chunk servers exists as the destinations of the request, one of the chunk servers is selected for the transmission. If communication cannot be established with the selected chunk server 102 for some reason, the client 103 sequentially attempts communication with another one of the chunk servers 102.

The chunk server 102 receives the acquisition request for the respective chunks 902 and then transmits data of the requested chunk file to the client 103 (s2105, s2106). Specifically, the local file system management unit 501 of the chunk server 102 acquires the file name 1802 of the chunk 902 corresponding to the chunk ID 1701 received from the client in the local file system from the chunk file management table 1800 and transmits the contents of the chunk 902 to the client 103.

The client 103 receives the chunk file data transmitted from the chunk data 102 (s2107) and the snapshot reading process is completed. With such a configuration, the file data maintained as a snapshot taken at a certain time point can be read and utilized later.

Snapshot File Deletion Process

Figure 22:
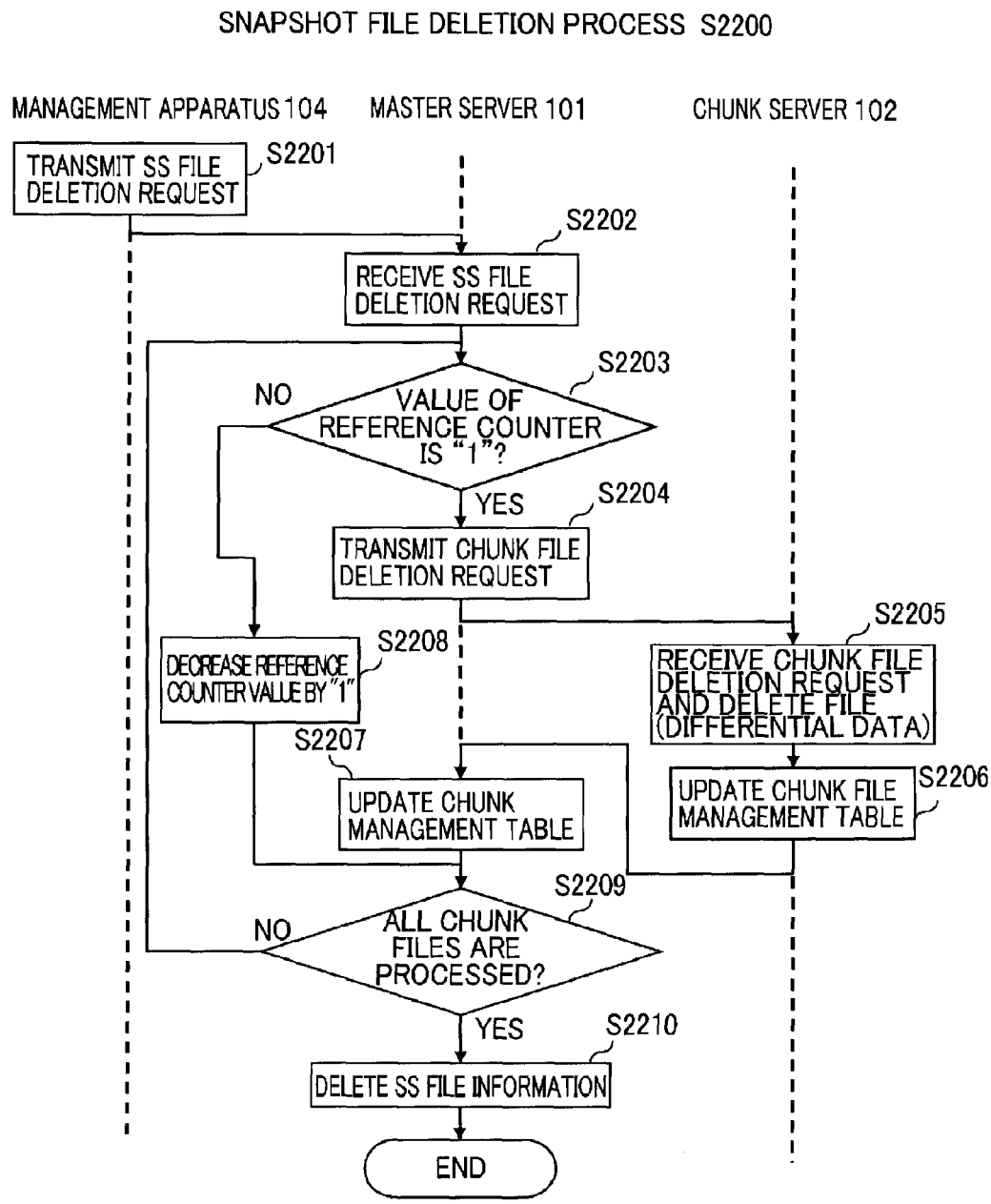
FIG. 22 is a flowchart of an example of a snapshot file deletion process in the information processing system 1 of the first example.

A snapshot file deletion process in the information processing system 1 of the example will be described with reference to FIG. 22.

First, based on the instruction from the administrator, the snapshot management unit 601 of the management apparatus 104 transmits a deletion request for a certain snapshot file among the snapshots taken for one file 901 to the master server 101 (s2201) and the file system management unit 401 of the master server 101 receives this instruction (s2202).

The file system management unit 401 of the master server 101 refers to the snapshot file information 810 of the snapshot file to be deleted on the file information management table 1600 to acquire the chunk ID 802 making up the snapshot file. The file system management unit 401 sequentially refers to the reference counters 1703 correlated with the acquired chunk IDs 1701 on the chunk management table 1700 through the chunk management unit 402 (s2203).

Specifically, the file system management unit 401 instructs the chunk management unit 402 to refer to the reference counters 1703 of the chunk IDs 1701 on the chunk management table 1700. The instructed chunk management unit 402 sequentially acquires and delivers the reference counters 1703 of the chunk IDs 1701 to the file system management unit 401 to determine whether the value recorded in the reference counter 1703 is "1" (s2203).

If it is determined that a value of the reference counter 1703 corresponding to the chunk ID 1701 is "1", i.e., if it is determined that the chunk is pointed only by the file information 810 of the snapshot (s2203, Yes), the deletion instruction for the chunk 902 is transmitted to all the chunk servers 102 storing the chunk 902 along with the chunk ID 1701 (s2204). The chunk server ID 1702 of the chunk server 102 storing the chunk 902 is acquired from the chunk management table 1700.

The local file system management unit 501 of the chunk server 102 receiving the deletion request for the chunk 902 from the master server 101 acquires from the chunk file management table 1800 the file name 1802 of the chunk file 902 indicated by the chunk ID 1801 to be deleted to make a deletion request for the chunk file 902 to the differential snapshot management unit 502 and the differential snapshot management unit 502 deletes the chunk file 902 (s2205). The local file system management unit 501 of the chunk server 102 deletes from the chunk file management table 1800 the line corresponding to the chunk ID 1801 of the chunk file 902 deleted by the differential snapshot management unit 502 at the same time (s2206) and notifies the master server 101 of the completion of the deletion of the chunk file.

The file system management unit 401 of the master server 101 receives the notification from the chunk server 102 and deletes from the chunk management table 1700 the line corresponding to the chunk ID 1701 of the chunk 902 to be deleted (s2207).

The file system management unit 401 of the master server 101 determines whether the above process from s2203 to s2207 has been executed for all the chunks 902 pointed by the file information 810 of the snapshot file 901 (s2209) and deletes the file information 810 of the snapshot file 901 from the file information management table 1600 (s2210) if it is determined that the process has been executed for all the chunks (s2209, Yes).

If it is determined the above process from s2203 to s2207 is performed for not all of the chunks 902 (s2209, No), the process goes back to s2203.

If it is determined that the reference counter 1703 corresponding to the chunk ID 1701 of the chunk 902 to be deleted is "2" (s2203, No), i.e., if it is determined that the chunk is pointed by other than the file information 810 of the snapshot (s2203, No), the file system management unit 401 decreases the value of the reference counter 1703 by one in the chunk management table 1700 since the chunk 902 must not be deleted (s2208). The process then goes to s2209.

The snapshot file deletion process is completed as above. With such a configuration, the storage capacity provided by the storage apparatus 230 of the chunk server 102 may efficiently be used since the storage area allocated to the chunk 902 no longer used in the snapshot file 901 is released.

EXAMPLE 2

A second example of the present invention will then be described. The information processing system 1 of the second example gives the differential snapshot taking instruction to the chunk server 102 at the time of the file update instead of the time of the snapshot taking. Since a portion of the snapshot taking process and a portion of the file update process are performed in different forms as compared to the first example, only these process procedures will be described with reference mainly to FIGS. 23 and 24.

Snapshot Taking Process S2300

Figure 23:
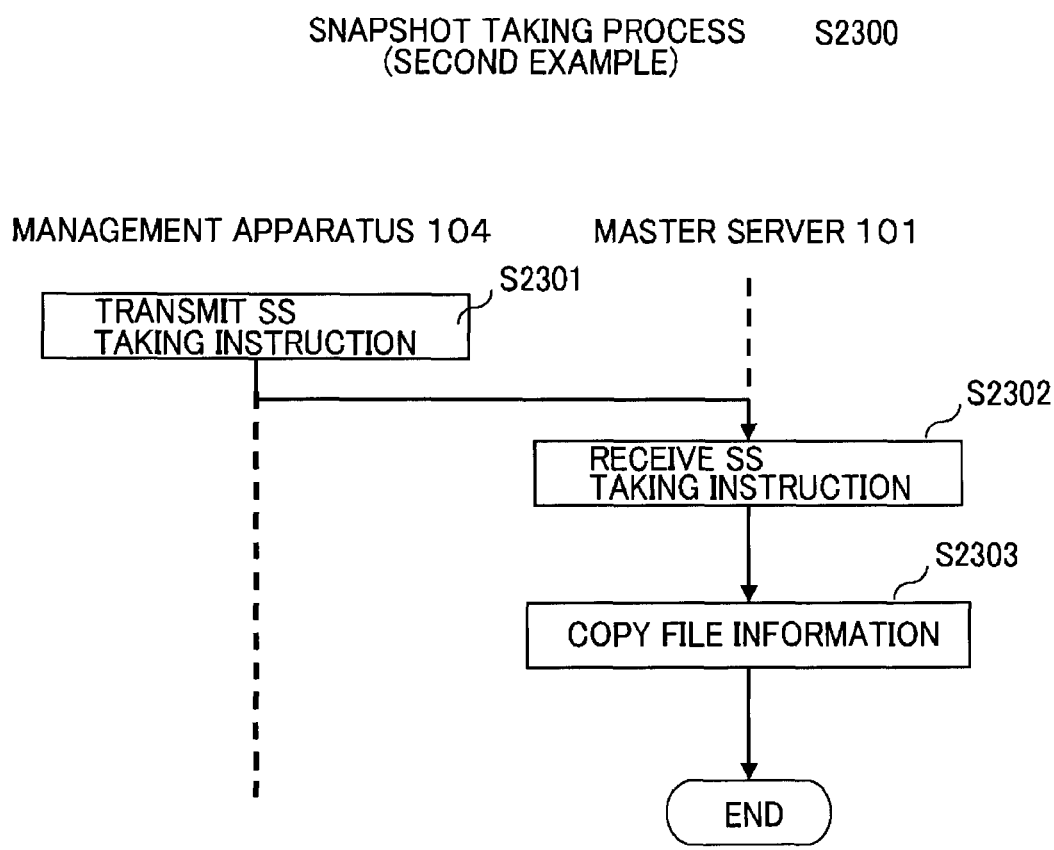
FIG. 23 is a flowchart of an example of a snapshot taking process in the information processing system 1 of the second example.

A snapshot taking process S2300 of the information processing system 1 of the second example will be described with reference to FIG. 23.

First, the administrator transmits an instruction for taking a snapshot of the certain file 901 to the master server 101 (s2301) and the file system management unit 401 of the master server 101 receives this instruction (s2302). This step is the same as s1901 and s1902 of FIG. 19 described in the first example.

The file system management unit 401 of the master server 101 copies the file information 800 of the file 901 and stores the file name 801 of the snapshot file in the file name 801 (s2303). This step is the same as s1903 of FIG. 19 described in the first example.

The snapshot taking process is completed as above. With such a configuration, loads of the network 105 and the chunk server 102 may be reduced since no communication is performed between the master server 101 and the chunk server 102 when taking the snapshot.

File Update Process

Figure 24:
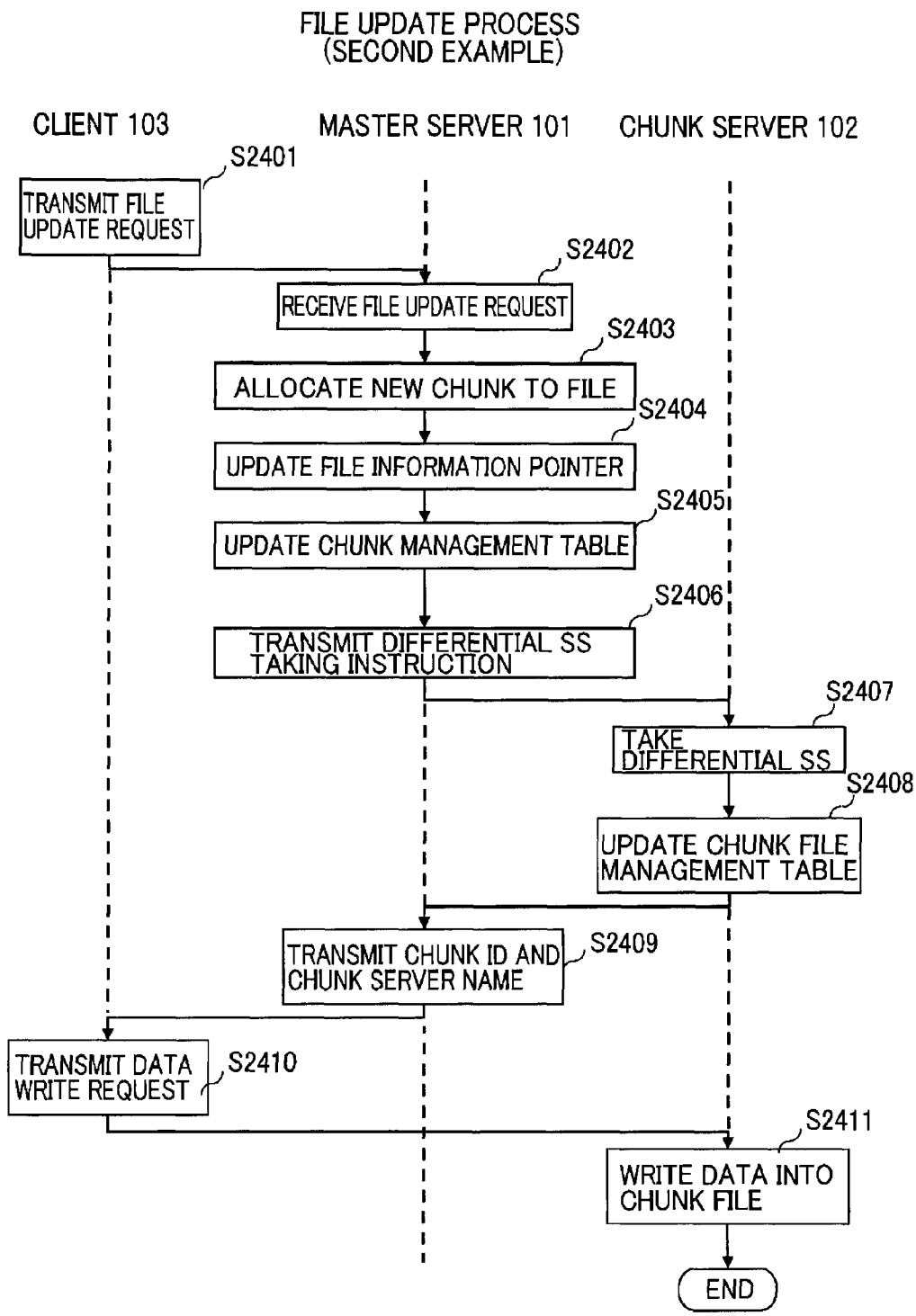
FIG. 24 is a flowchart of an example of a file update process in the information processing system 1 of the second example.

A file update process in the information processing system 1 of the example will be described with reference to FIG. 24.

First, the client 103 transmits an update request for the certain file 901 to the master server 101 (s2401) and the master server 101 receives the update request from the client 103 (s2402). These steps are the same as s2001 and s2002 of FIG. 20 described in the first example.

The file system management unit 401 of the master server 101 identifies the chunk 902 to be updated based on the file information included in the received update request and allocates the new chunk ID 802 to the chunk 902 (s2403). This step is the same as s2003 of FIG. 20 described in the first example.

The file system management unit 401 of the master server 101 updates the file information 800 of the file 901 (s2404). This step is the same as s2004 of FIG. 20 described in the first example.

The chunk management unit 402 of the master server 101 then updates the chunk management table 1700 (s2405). This step is the same as s2005 of FIG. 20 described in the first example.

The file system management unit 401 of the master server 101 transmits an instruction for the differential snapshot taking to all the chunk servers 102 retaining the chunk 902 included in the file 901 to be updated. The chunk IDs 802 of the new chunk 902a and the chunk 902 to be updated and an instruction for updating the chunk file management table 1800 are also transmitted to all the chunk servers 102 retaining the chunk 902 to be updated (s2406).

Specifically, the file system management unit 401 of the master server 101 identifies the chunk servers 102 storing the respective chunks 902 indicated by the chunk ID 802 stored in the file information 800 of the file 901 from the chunk management table 1700 and transmits the differential snapshot taking instruction to all the chunk servers 102 along with the chunk ID 802. The file system management unit 401 of the master server 101 also transmits the chunk IDs 802 of the new chunk 902a and the chunk 902 to be updated to the local file system management units 501 of all the chunk servers 102 retaining the chunk 902 to be updated and gives an instruction for updating the chunk file management table 1800 of the chunk servers to the local file system management units 501.

The local file system management unit 501 of the chunk server 102 receives the above differential snapshot taking instruction and instructs the differential snapshot management unit 502 to take the differential snapshot of the whole local file system 231 or the chunk files indicated by the chunk ID 802, and the differential snapshot management unit 502 executes the differential snapshot taking (s2407). This step is the same as s1906 of FIG. 19 described in the first example.

When the chunk server 102 takes the differential snapshot, the local file system management unit 501 of the chunk server 102 updates the chunk file management table 1800 (s2408). Specifically, the local file system management unit 501 stores the file name 1802 of the differential snapshot of the chunk 902 in a field of the chunk file name 1802 corresponding to the chunk ID 1801 of the instruction on the chunk file management table 1800 of the chunk server 102. The local file system management unit 501 adds a line for the chunk ID 1801 of the new chunk 902a on the chunk file management tables 1800 at the same time and stores the current file name 1802 of the chunk ID 1801 of the chunk 902 to be updated (instead of the differential snapshot image at the past time point) in the field of the file name 1802. This step is the same as s1907 of FIG. 19 described in the first example with s2007 of FIG. 20 added.

The master server 101 then reads and transmits the chunk ID 1701 of the new chunk 902a and the chunk server name 1702 of the chunk server storing the chunk from the chunk management table 1700 to the client 103 making the update request (s2409). This step is the same as s2008 of FIG. 20 described in the first example.

The client 103 receives the chunk ID 1701 of the new chunk 902a as the chunk 902 to be updated and the storing chunk server name 1702 and transmits a write request to the corresponding chunk server 102 (s2410) and the chunk server 102 receiving the request performs the writing to the chunk file 902 indicated by the chunk ID 1701 (s2411). This step is the same as s2010 of FIG. 20 described in the first example.

The file update process is completed as above. With such a configuration, the process load of the chunk server 102 is alleviated and the storage capacity provided by the storage apparatus 230 of the chunk server 102 may more efficiently be used since the differential snapshot taking process is not executed in the chunk server 102 until the client 130 makes the update request for the file 901.

Although the present invention has been described in terms of the examples thereof with reference to the accompanying drawings, the present invention is not limited to these examples. All modifications and equivalents not departing from the spirit of the present invention fall within the range of the present invention.

The invention claimed is:

1. An information processing system that retains one or more data files utilized by an external apparatus, each of which is made up of a plurality of data blocks, in a manner that the data blocks making up each of the files are distributed, comprising:

a first information apparatus comprising a first computer, and configured to retain a data file ID as an identifier for identifying each of the data files and a data block ID as an identifier for identifying each of the data blocks making up the data files in a correlated manner; and a plurality of second information apparatuses, each comprising a different respective computer, communicatively coupled to the first information apparatus, each configured to retain a plurality of the data blocks and the data block ID in a correlated manner, the second information apparatus being allocated with apparatus ID as an identifier for identifying each of the second information apparatuses, the first information apparatus, in response to an inquiry with the data file ID from the external apparatus, is configured to transmit the apparatus ID of the second information apparatus retaining the data block making up the data file identified by the data file ID and the data block ID of the data block to the external apparatus, the first information apparatus configured to retain the data block ID and the apparatus ID of the second information apparatus configured to retain the data block identified by the data block ID in a correlated manner, the first information apparatus including a file system management unit that is configured to replicate the data file ID owned by the data file and the data block ID of the data block making up the data file, the second information apparatus including a differential data copy processing unit configured to execute a differential data copy process of replicating and configured to retain only differential data for the data block if the data block retained by the second information apparatus is updated from the external apparatus, the first information apparatus, upon receipt of a backup process request for the data file identified by the data file ID, configured to identify the second information apparatus retaining the data block making up the data file from the data file ID of the data file of the backup process request and to transmit an instruction for executing a differential data copy process for the data block to the differential data copy processing unit of the second information apparatus, the instructed differential data copy processing unit configured to execute a differential data copy of the data block and to correlate a file generated by the differential data copy with the data block ID, wherein the second information apparatuses are configured to replicate and to retain the data block, wherein the first information apparatus includes a file information management table that retains the data file ID as an identifier for identifying each of the data files and the data block ID as an identifier for identifying each of the data blocks making up the data files in a correlated manner, and a data block management table that retains the data block ID and the apparatus ID of the second information apparatus retaining the data block identified by the data block ID in a correlated manner, wherein the second information apparatus includes a data block file management table that retains the data block ID and a file ID of the data block identified by the data block ID in a local file system set in the second information apparatus in a correlated manner, wherein if a backup process request is received for the data file identified by the data file ID, the file system management unit is configured to copy correlation between the data file ID and the data block ID identifying the data block making up the data file on the file information management table, to identify the second information apparatus retaining the data block making up the data file with reference to the data block management table, and to transmit an instruction for executing a differential data copy process for the data block to the differential data copy processing unit of the identified second information apparatus, wherein the instructed differential data copy processing unit is configured to execute the differential data copy process of the data block and to correlate the differential data copy with the data block ID on the data block file management table, and wherein after the backup process request is executed, if an update request for the data file of the backup process request is received from the external apparatus, the first information apparatus is configured to identify a corresponding data block in the data file in accordance with information related to the data block to be updated associated with the update request, to generate the new data block to allocate the new data block ID thereto, to identify the second information apparatus that retains the data block to be updated, and to drive the differential data copy processing unit of the second information apparatus to execute a process of correlating the data block ID of the new data block with the data block before the differential data copy process.

2. The information processing system of claim 1, wherein if a read request for the data block of the differential data copy generated for the data file is received from the external apparatus, the differential data copy processing unit of the second information apparatus returns the data block or the differential data copy correlated with the data block added to the data block.

3. The information processing system of claim 1, wherein the first information apparatus retains the data block ID and reference counter information for the data block identified by the data block ID, which is information incremented in accordance with the number of times of execution of the differential data copy generation process for the data file including the data block, in a correlated manner, and wherein if the differential data copy deletion process for the data file is received from the external apparatus, the first information apparatus checks the reference counter information correlated with the respective data blocks making up the differential data copy and deletes the data blocks if the reference counter information indicates one.

4. The information processing system of claim 1, wherein when a snapshot request for taking a snapshot of one of the data files is received, the file information management table increments the data file ID of the one of the data files after the snapshot is taken, and a reference counter that is stored in the file information management table and that is associated with the one of the data files is taken is incremented by one.

5. An information processing system that retains one or more data files utilized by an external apparatus, each of which is made up of a plurality of data blocks, in a manner that the data blocks making up each of the files are distributed, comprising:

a first information apparatus comprising a first computer, and configured to retain a data file ID as an identifier for identifying each of the data files and a data block ID as an identifier for identifying each of the data blocks making up the data files in a correlated manner; and a plurality of second information apparatuses, each comprising a different respective computer, communicatively coupled to the first information apparatus, each configured to retain a plurality of the data blocks and the data block ID in a correlated manner, the second information apparatus being allocated with apparatus ID as an identifier for identifying each of the second information apparatuses, the first information apparatus, in response to an inquiry with the data file ID from the external apparatus, is configured to transmit the apparatus ID of the second information apparatus retaining the data block making up the data file identified by the data file ID and the data block ID of the data block to the external apparatus, the first information apparatus configured to retain the data block ID and the apparatus ID of the second information apparatus configured to retain the data block identified by the data block ID in a correlated manner, the first information apparatus including a file system management unit that is configured to replicate the data file ID owned by the data file and the data block ID of the data block making up the data file, the second information apparatus including a differential data copy processing unit that is configured to execute a differential data copy process of replicating and to retain only differential data for the data block if the data block retained by the second information apparatus is updated from the external apparatus, the first information apparatus upon receipt of a backup process request for the data file identified by the data file ID, configured to copy correlation between the data file ID and the data block ID identifying the data block making up the data file, the first information apparatus, upon receipt of an update request for the data file of the backup process request from the external apparatus after the backup process request is executed, configured to identify a corresponding data block in the data file in accordance with information related to the data block to be updated associated with the update request, to generate the new data block to allocate the new data block ID thereto, identifying the second information apparatus that retains the data block to be updated, and to drive the differential data copy processing unit of the second information apparatus to execute a process of correlating the data block ID of the new data block with the data block before the differential data copy process.

6. The information processing system of claim 5, wherein if a read request for the data block of the differential data copy generated for the data file is received from the external apparatus, the differential data copy processing unit of the second information apparatus returns the data block or the differential data copy correlated with the data block added to the data block.

7. The information processing system of claim 5, wherein the first information apparatus retains the data block ID and reference counter information for the data block identified by the data block ID, which is information incremented in accordance with the number of times of execution of the differential data copy generation process for the data file including the data block, in a correlated manner, and wherein if the differential data copy deletion process for the data file is received from the external apparatus, the first information apparatus checks the reference counter information correlated with the respective data blocks making up the differential data copy and deletes the data blocks if the reference counter information indicates one.

8. A data backup method of an information processing system that retains one or more data files utilized by an external apparatus, each of which is made up of a plurality of data blocks, in a manner that the data blocks making up each of the files are distributed, the information processing system including a first information apparatus comprising a first computer, and configured to retain a data file ID as an identification code for identifying each of the data files and a data block ID as an identifier for identifying each of the data blocks making up the data files in a correlated manner, and a plurality of second information apparatuses, each comprising a different respective computer, communicatively coupled to the first information apparatus, each configured to retain a plurality of the data blocks and the data block ID in a correlated manner, the second information apparatus being allocated with apparatus ID as an identifier for identifying each of the second information apparatuses, the method comprising:

the first information apparatus, in response to an inquiry with the data file ID from the external apparatus, transmitting the apparatus ID of the second information apparatus retaining the data block making up the data file identified by the data file ID and the data block ID of the data block to the external apparatus, the first information apparatus retaining the data block ID and the apparatus ID of the second information apparatus retaining the data block identified by the data block ID in a correlated manner, the first information apparatus copying the data file ID owned by the data file and the data block ID of the data block making up the data file;

the second information apparatus executing a differential data copy process of replicating and retaining only differential data for the data block if the data block retained by the second information apparatus is updated from the external apparatus; and the first information apparatus, upon receipt of a backup process request for the data file identified by the data file ID, identifying the second information apparatus retaining the data block making up the data file from the data file ID of the data file of the backup process request and transmits an instruction for executing a differential data copy process for the data block to the differential data copy processing unit of the second information apparatus, the instructed differential data copy processing unit executing a differential data copy of the data block and correlating a file generated by the differential data copy with the data block ID, wherein after the backup process request is executed, if an update request for the data file of the backup process request is received from the external apparatus, the first information apparatus identifies a corresponding data block in the data file in accordance with information related to the data block to be updated associated with the update request, generates the new data block to allocate the new data block ID thereto, identifies the second information apparatus that retains the data block to be updated, and drives the differential data copy processing unit of the second information apparatus to execute a process of correlating the data block ID of the new data block with the data block before the differential data copy process.

9. The data backup method of claim 8, wherein if a read request for the data block of the differential data copy generated for the data file is received from the external apparatus, the differential data copy processing unit of the second information apparatus returns the data block or the differential data copy correlated with the data block added to the data block.

10. The data backup method of claim 8, wherein the first information apparatus retains the data block ID and reference counter information for the data block identified by the data block ID, which is information incremented in accordance with the number of times of execution of the differential data copy generation process for the data file including the data block, in a correlated manner, and wherein if the differential data copy deletion process for the data file is received from the external apparatus, the first information apparatus checks the reference counter information correlated with the respective data blocks making up the differential data copy and deletes the data blocks if the reference counter information indicates one.

* * * * *